US009218339B2

(12) United States Patent
Zechner et al.

(10) Patent No.: US 9,218,339 B2
(45) Date of Patent: Dec. 22, 2015

(54) COMPUTER-IMPLEMENTED SYSTEMS AND METHODS FOR CONTENT SCORING OF SPOKEN RESPONSES

(71) Applicant: Educational Testing Service, Princeton, NJ (US)

(72) Inventors: Klaus Zechner, Princeton, NJ (US); Keelan Evanini, Pennington, NJ (US); Lei Chen, Pennington, NJ (US); Shasha Xie, Lawrenceville, NJ (US); Wenting Xiong, Pittsburgh, PA (US); Fei Huang, Philadelphia, PA (US); Jana Sukkarieh, Princeton, NJ (US); Miao Chen, Bloomington, IN (US)

(73) Assignee: Educational Testing Service, Princeton, NJ (US)

( * ) Notice: Subject to any disclaimer, the term of this patent is extended or adjusted under 35 U.S.C. 154(b) by 449 days.

(21) Appl. No.: 13/688,306

(22) Filed: Nov. 29, 2012

(65) Prior Publication Data

US 2013/0158982 A1 Jun. 20, 2013

Related U.S. Application Data

(60) Provisional application No. 61/564,351, filed on Nov. 29, 2011, provisional application No. 61/582,908, filed on Jan. 4, 2012, provisional application No. 61/582,919, filed on Jan. 4, 2012.

(51) Int. Cl.
*G06F 17/27* (2006.01)
*G06F 17/28* (2006.01)
(Continued)

(52) U.S. Cl.
CPC .............. *G06F 17/28* (2013.01); *G09B 19/06* (2013.01); *G10L 15/1815* (2013.01); *G10L 2015/088* (2013.01)

(58) Field of Classification Search
CPC ... G10L 15/063; G10L 15/02; G10L 15/1815; G06F 17/2785; G06F 17/2715; G06K 9/6222
USPC ........... 704/9, 10, 2, 231, 234, 235, 240, 243, 704/246, 251, 254, 270.1, 277; 382/209; 706/46; 707/706, 742, 769
See application file for complete search history.

(56) References Cited

U.S. PATENT DOCUMENTS 5,887,120 A * 3/1999 Wical ............................. 706/46
6,411,930 B1 * 6/2002 Burges ......................... 704/240
(Continued)

OTHER PUBLICATIONS

Zechner, Klaus, Higgins, Derrick, Xi, Xiaoming; SpeechRater: A Construct Driven Approach to Score Spontaneous Non-Native Speech; Proceedings of the 2007 Workshop of the International Speech Communication Association Special Interest Group on Speech and Language Technology in Education; 2007.
(Continued)

*Primary Examiner* — Michael Colucci
(74) *Attorney, Agent, or Firm* — Jones Day (57) ABSTRACT

Systems and methods are provided for scoring a non-scripted speech sample. A system includes one or more data processors and one or more computer-readable mediums. The computer-readable mediums are encoded with a non-scripted speech sample data structure, where the non-scripted speech sample data structure includes: a speech sample identifier that identifies a non-scripted speech sample, a content feature extracted from the non-scripted speech sample, and a content-based speech score for the non-scripted speech sample. The computer-readable mediums further include instructions for commanding the one or more data processors to extract the content feature from a set of words automatically recognized in the non-scripted speech sample and to score the non-scripted speech sample by providing the extracted content feature to a scoring model to generate the content-based speech score.

41 Claims, 8 Drawing Sheets

(51) Int. Cl.
 *G10L 15/18* (2013.01)
 *G09B 19/06* (2006.01)
 *G10L 15/08* (2006.01)

(56) References Cited

U.S. PATENT DOCUMENTS

| | | | |
|---|---|---|---|
| 7,092,888 B1* | 8/2006 | McCarthy et al. | 704/277 |
| 8,296,141 B2* | 10/2012 | Gilbert et al. | 704/254 |
| 8,838,434 B1* | 9/2014 | Liu | 704/2 |
| 2002/0128831 A1* | 9/2002 | Ju et al. | 704/231 |
| 2003/0023434 A1* | 1/2003 | Boman et al. | 704/234 |
| 2005/0049851 A1* | 3/2005 | Watanabe et al. | 704/2 |
| 2006/0074655 A1* | 4/2006 | Bejar et al. | 704/243 |
| 2006/0235696 A1* | 10/2006 | Bennett | 704/270.1 |
| 2006/0277033 A1* | 12/2006 | Gao et al. | 704/10 |
| 2008/0010065 A1* | 1/2008 | Bratt et al. | 704/246 |
| 2008/0033720 A1* | 2/2008 | Kankar et al. | 704/235 |
| 2008/0270133 A1* | 10/2008 | Tian et al. | 704/251 |
| 2009/0190839 A1* | 7/2009 | Higgins | 382/209 |
| 2011/0066623 A1* | 3/2011 | Weissman | 707/742 |
| 2011/0066634 A1* | 3/2011 | Phillips et al. | 707/769 |
| 2012/0116767 A1* | 5/2012 | Hasdell et al. | 704/254 |
| 2012/0158399 A1* | 6/2012 | Tremblay et al. | 704/9 |
| 2012/0317088 A1* | 12/2012 | Pantel et al. | 707/706 |

OTHER PUBLICATIONS

Zesch, Torsten, Gurevych, Iryna, Muhlhauser, Max; Analyzing and Accessing Wikipedia as a Lexical Semantic Resource; Data Structures for Linguistic Resources and Applications; pp. 197-205; 2007.
Zhang, Xiaodan; Exploiting External/Domain Knowledge to Enhance Traditional Text Mining Using Graph-Based Methods; Ph.D. Thesis, Drexel University; Jun. 2009.
Attali, Yigal, Burstein, Jill; Automated Essay Scoring With E-Rater, V.2; Journal of Technology, Learning and Assessment, 4(3); 2006.
Bernstein, Jared, Van Moer, Alistair, Cheng, Jian; Validating Automated Speaking Tests; Language Testing, 27(3); pp. 355-377; 2010.
Bernstein, Jared; Ordinate Corporation—Phonepass Testing: Structure and Construct; 1999.
Bernstein, Jared, De Jong, John, Pisoni, David, Townshend, Brent; Two Experiments on Automatic Scoring of Spoken Language Proficiency; Proceedings of Integrating Speech Technology in Learning; pp. 57-61; 2000.
Bernstein, Jared, Cheng, Jian, Suzuki, Masanori; Fluency and Structural Complexity as Predictors of L2 Oral Proficiency; Proceedings of Interspeech; pp. 1241-1244; 2010.
Bloehdorn, Stephan, Hotho, Andreas; Boosting for Text Classification with Semantic Features; Proceedings of the MSW 2004 Workshop at the 10th ACM SIGKDD Conference on Knowledge Discovery and Data Mining; pp. 70-87; 2004.
Brown, Peter, Della Pietra, Vincent, Desouza, Peter, Lai, Jenifer, Mercer, Robert; Class-Based n-gram-models of Natural Language; Computational Linguistics, 18(4); pp. 467-479; 1992.
Burstein, Jill; The E-rater Scoring Engine: Automated Essay Scoring With Natural Language Processing; Ch. 7, In Automated Essay Scoring: A Cross-Disciplinary Perspective, M.D. Shermis, J. Burstein (Eds.); pp. 113-121; 2003.
Chang, Ming-Wei, Ratinov, Lev, Roth, Dan, Srikumar, Vivec; Importance of Semantic Representation: Dataless Classification; Association for the Advancement of Artificial Intelligence; 2008.
Chen, Miao, Zechner, Klaus; Computing and Evaluating Syntactic Complexity Features for Automated Scoring of Spontaneous Non-Native Speech; Proceedings of the 49th Annual Meeting of the Association for Computational Linguistics and the Human Language Technologies Conference; pp. 722-731; 2011.
Chen, Lei, Zechner, Klaus; Applying Rhythm Features to Automatically Assess Non-Native Speech; Proceedings of Interspeech; 2011.
Chen, Lei, Zechner, Klaus, Xi, Xiaoming; Improved Pronunciation Features for Construct-Driven Assessment of Non-Native Spontaneous Speech; Proceedings of the North American Chapter of the ACL, Human Language Technologies; pp. 442-449; 2009.
Cohen, William; Text Categorization and Relational Learning; Proceedings of the 12th International Conference on Machine Learning; 1995.
Corley, Courtney, Mihalcea, Rada; Measuring the Semantic Similarity of Texts; Proceedings of the ACL Workshop on Empirical Modeling of Semantic Equivalence and Entailment; pp. 13-18; 2005.
Cucchiarini, Catia, Strik, Helmer, Boves, Lou; Automatic Evaluation of Dutch Pronunciation by Using Speech Recognition Technology; IEEE Workshop on Automatic Speech Recognition and Understanding; 1997.
Cucchiarini, Catia, Strik, Helmer, Boves, Lou; Quantitative Assessment of Second Language Learners' Fluency: by Means of Automatic Speech Recognition Technology; Journal of the Acoustical Society of America, 107(2); pp. 989-999; 2000.
Cucchiarini, Catia, Strik, Helmer, Boves, Lou; Quantitative Assessment of Second Language Learners' Fluency: Comparisons Between Read and Spontaneous Speech; Journal of the Acoustical Society of America, 111(6); pp. 2862-2873; 2002.
Dikli, Semire; An Overview of Automated Scoring of Essays; Journal of Technology, Learning and Assessment, 5(1); 2006.
Dodigovic, Marina; Speech Processing Technology in Second Language Testing; Proceedings of the Conference on Language & Technology; pp. 113-120; 2009.
Eskenazi, Maxine; Spoken Language Technology for Education; Speech Communication, 51(10); pp. 832-844; 2009.
Fellbaum, Christiane; WordNet: An Electronic Lexical Database; Cambridge, MA: MIT Press; 1998.
Foltz, Peter, Laham, Darrell, Landauer, Thomas; The Intelligent Essay Assessor: Applications to Educational Technology; Interactive Multimedia Electronic Journal of Computer-Enhanced Learning, 1; 1999.
Franco, Horacio, Abrash, Victor, Precoda, Kristin, Bratt, Harry, Rao, Ramana, Butzberger, John, Rossier, Romain, Cesari, Federico; The SRI EduSpeak System: Recognition and Pronunciation Scoring for Language Learning; Proceedings of In-STiLL; 2000.
Franco, Horacio, Neumeyer, Leonardo, Digalakis, Vassilios, Ronen, Orith; Combination of Machine Scores for Automatic Grading of Pronunciation Quality; Speech Communication, 30; pp. 121-130; 2000.
Gabrilovich, Evgeniy, Markovitch, Shaul; Computing Semantic Relatedness Using Wikipedia-Based Explicit Semantic Analysis; Proceedings of the 20th International Joint Conference on Artificial Intelligence; pp. 1606-1611; 2007.
Higgins, Derrick, Burstein, Jill, Attali, Yigal; Identifying Off-Topic Student Essays Without Topic-Specific Training Data; Natural Language Engineering, 12(2); pp. 145-159; 2006.
Hoffman, Thomas; Unsupervised Learning by Probabilistic Latent Semantic Analysis; Machine Learning, 42(1); pp. 177-196; 2001.
Hotho, Andreas, Staab, Steffen; Stumme, Gerd; Ontologies Improve Text Document Clustering; Proceedings of the 3rd IEEE International Conference on Data Mining; 2003.
Hotho, Andreas, Staab, Steffen, Maedche, A.; Ontology-Based Text Document Clustering; Kunstliche Intelligenz, 4; pp. 48-54; 2002.
Huang, Fei, Yates, Alexander; Distributional Representations for Handling Sparsity in Supervised Sequence-Labeling; Proceedings of the 47th Annual Meeting of the ACL; pp. 495-503; 2009.
Kazama, Jun'ichi, Torisawa, Kentaro; Exploiting Wikipedia as External Knowledge for Named Entity Recognition; Proceedings of the 2007 Joint Conference on Empirical Methods in Natural Language Processing on Computational Natural Language Learning; pp. 698-707; 2007.
Landauer, Thomas, Laham, Darrell, Foltz, Peter; Automated Scoring and Annotation of Essays with the Intelligent Essay Assessor; Ch. 6, In Automated Essay Scoring: A Cross-Disciplinary Perspective, M. Shermis, J. Burstein (Eds.); pp. 87-112; 2003.
Landauer, Thomas, Foltz, Peter, Laham, Darrell; Introduction to Latent Semantic Analysis; Discourse Processes, 25; pp. 259-284; 1998.
Landauer, Thomas, Laham, Darrell, Rehder, Bob, Schreiner, M.E.; How Well Can Passage Meaning be Derived Without Using Word Order? A Comparison of Latent Semantic Analysis and Humans; Proceedings of the 19th Annual Meeting of the Cognitive Science Society; pp. 412-417; 1997.

(56) References Cited

OTHER PUBLICATIONS

Larkey, Leah, Croft, W. Bruce; A Text Categorization Approach to Automated Essay Grading; Ch. 4 in Automated Essay Scoring: A Cross-Discipline Perspective, M. Shermis, J. Burstein (Eds.); pp. 55-70; 2003.

Lin, Dekang; An Information-Theoretic Definition of Similarity; Proceedings of the 15th International Conference on Machine Learning; 1998.

McCallum, Andrew; Bow: A Toolkit for Statistical Language Modeling, Text Retrieval, Classification and Clustering; http://www.cs.cmu.edu/mccallum/bow/; 1996.

Mihalcea, Rada, Corley, Courtney, Strapparava, Carlo; Corpus-Based and Knowledge-Based Measures of Text Semantic Similarity; Proceedings of the American Association for Artificial Intelligence; 2006.

Muller, Hans-Michael, Kenny, Eimear, Sternberg, Paul; Textpresso: an Ontology-Based Information Retrieval and Extraction System for Biological Literature; PLoS Biology, 2(11); pp. 1984-1998; 2004.

Pedersen, Ted, Patwardhan, Siddharth, Michelizzi, Jason; WordNet::Similarity—Measuring the Relatedness of Concepts; Proceedings of the 5th Annual Meeting of the North American Chapter of the Association for Computational Linguistics; 2004.

Pulman, Stephen, Sukkarieh, Jana; Automatic Short Answer Marking; Proceedings of the 3rd Workshop on Building Educational Applications Using NLP; pp. 9-16; 2005.

Richardson, Ray, Smeaton, Alan; Using WordNet in a Knowledge-Based Approach to Information Retrieval; Dublin City University, School of Computer Applications; 1995.

Sukkarieh, Jana, Blackmore, John; c-rater: Automatic Content Scoring for Short Constructed Responses; Proceedings of the 22nd Florida Artificial Intelligence Research Society (FLAIRS) Conference; pp. 290-295; 2009.

Sukkarieh, Jana, Pulman, Stephen, Raikes, Nicholas; Auto-Marking 2: An Update on the UCLES-Oxford University Research into Using Computational Linguistics to Score Short, Free Text Responses; International Association of Educational Assessment; 2004.

Turney, Peter; Mining the Web for Synonyms: PMI-IR versus LSA on TOEFL; Proceedings of the 12th European Conference on Machine Learning; pp. 491-502; 2001.

Wang, Bill, McKay, Robert, Abbass, Hussein, Barlow, Michael; A Comparative Study for Domain Ontology Guided Feature Extraction; Proceedings of the 25th Australian Computer Science Conference; 2003.

Wu, Zhibiao, Palmer, Martha; Verbs Semantics and Lexical Selection; Proceedings of the 32nd Annual Meeting on Association for Computational Linguistics; pp. 133-138; 1994.

Xi, Xiaoming, Higgins, Derrick, Zechner, Klaus, Williamson, David; Automated Scoring of Spontaneous Speech Using SpeechRaterSM v1.0; Educational Testing Service, Research Report RR-08-62; 2008.

Zechner, Klaus, Higgins, Derrick, Xi, Xiaoming, Williamson, David; Automatic Scoring of Non-Native Spontaneous Speech in Tests of Spoken English; Speech Communication, 51(10); pp. 883-895; 2009.

Zechner, Klaus, Xi, Xiaoming; Towards Automatic Scoring of a Test of Spoken Language with Heterogeneous Task Types; Proceedings of the 3rd Workshop on Innovative Use of NLP for Building Educational Applications; 2008.

* cited by examiner

COMPUTER-IMPLEMENTED SYSTEMS AND METHODS FOR CONTENT SCORING OF SPOKEN RESPONSES

CROSS-REFERENCE TO RELATED APPLICATIONS

This application claims the benefit of U.S. Provisional Patent Application Nos. 61/564,351 filed on Nov. 29, 2011, 61/582,908 filed on Jan. 4, 2012, and 61/582,919 filed on Jan. 4, 2012, the entire contents of each of which are incorporated herein by reference.

TECHNICAL FIELD

This document relates generally to automated response scoring and more particularly to automated scoring of spoken responses.

BACKGROUND

Automated speech assessment systems are used in conjunction with standardized or other tests designed to test a speaker's proficiency in speaking a certain language (e.g., Pearson Test of English Academic, Test of English as a Foreign Language, International English Language Testing System). In these tests, a verbal response is elicited from a test-taker by providing a test prompt, which asks the test-taker to construct a particular type of verbal response. For example, the test prompt may ask the test-taker to read aloud a word or passage, describe an event, or state an opinion about a given topic. Traditionally, the test-taker response is received at a computer-based system and certain non-content features of the response are analyzed to generate a score.

SUMMARY

In accordance with the teachings herein, systems and methods are provided for scoring a non-scripted speech sample. A system includes one or more data processors and one or more computer-readable mediums. The computer-readable mediums are encoded with a non-scripted speech sample data structure, where the non-scripted speech sample data structure includes: a speech sample identifier that identifies a non-scripted speech sample, a content feature extracted from the non-scripted speech sample, and a content-based speech score for the non-scripted speech sample. The computer-readable mediums further include instructions for commanding the one or more data processors to extract the content feature from a set of words automatically recognized in the non-scripted speech sample and to score the non-scripted speech sample by providing the extracted content feature to a scoring model to generate the content-based speech score.

As another example, a computer-implemented method of scoring a non-scripted speech sample extracts, using a processing system, a content feature from a set of words automatically recognized in the non-scripted speech sample. The method further scores, using the processing system, the non-scripted speech sample by providing the extracted content feature to a scoring model to generate a content-based speech score.

DETAILED DESCRIPTION

Figure 1:
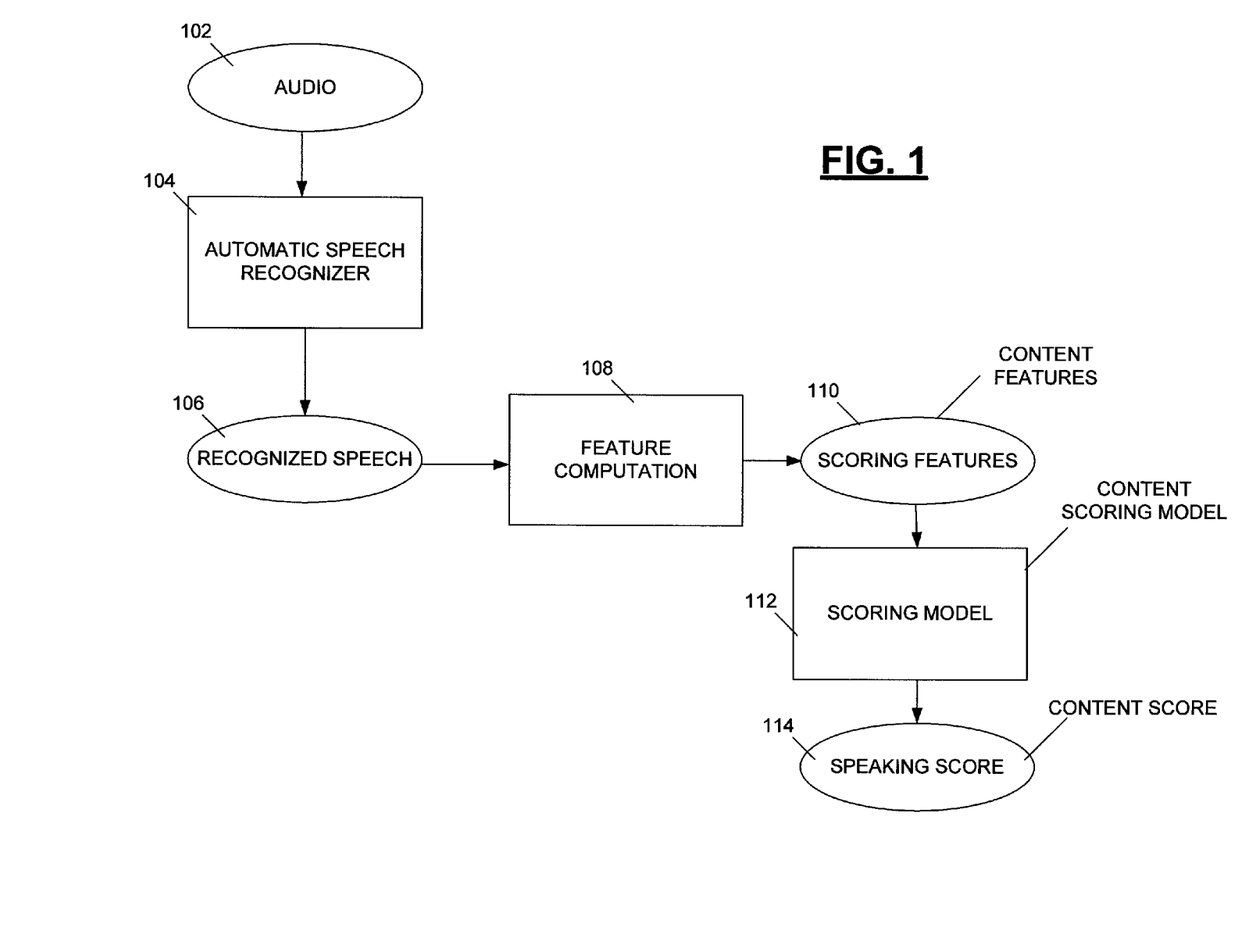
FIG. 1 is a block diagram depicting a computer-implemented system for scoring a non-scripted speech sample.

FIG. 1 is a block diagram depicting a computer-implemented system for scoring a non-scripted speech sample. Non-scripted speech sample scoring systems have been limited in their ability to generate scores based upon the content of the non-scripted speech sample. Because of inaccuracies of automatic speech recognizers, such automatic scoring systems are usually limited to scoring the non-scripted speech based upon non-content metrics such as fluency, pronunciation, pitch, and prosody. The system depicted in FIG. 1 is able to enhance scoring of non-scripted responses by considering content features of received responses in generating a score.

In the example of FIG. 1, an audio recording 102, such as a recording of a test taker providing a non-scripted response in reply to a test prompt, is received and provided to an automatic speech recognizer 104. The automated speech recognizer 104 may take a variety of forms, such as a Hidden Markov Model that generates hypotheses of words recognized in the audio 102 and confidence scores associated with those hypotheses to generate a recognized speech transcript 106. In other examples, the automatic speech recognizer 104 may be human aided, with a human providing all or part of the recognized speech transcript 106. The recognized speech transcript 106 is provided for feature computation 108 where one or more scoring features 110, such as content features, are extracted from the set of words 106 automatically recognized in the non-scripted speech sample audio 102. The scoring feature 110 is provided to a scoring model 112, where the non-scripted speech sample audio 102 is scored based on the extracted scoring feature 110 to generate a speaking score 114. For example, the scoring model 112 may base the speaking score 114, in whole or in part on content scoring features 110. In cases where the scoring model 112 provides the speaking score 114 wholly based on one or more content features, the scoring model 112 can be referred to as a content scoring model that provides a content score. The speaking score 114 (or content score) may be returned as a total score for the non-scripted speaking response audio 102, or the speaking score 114 may be considered along with other metrics (e.g., fluency, pronunciation, pitch, and prosody) in generating a score for the speech sample 102.

A scoring model 112 may take a variety of forms. In one example, the scoring model 112 may include a set of score-level sub-models, where each of the score-level sub-models compares extracted scoring features 110 to training responses that have been previously assigned specific scores on the scoring scale (e.g., for a response that is to be scored on a scale of 0-4, the scoring model 112 could include a 1-point level scoring sub-model, a 2-point level scoring sub-model, a 3-point level scoring sub-model, and a 4-point level scoring sub-model). Each of the sub-models may be trained using training responses that have been assigned a score corresponding to that sub-model. Using the score-level specific sub-models, the scoring model 112 can compare the scoring features 110 of the non-scripted speech sample audio 102 to the training responses using the sub-models to see to which score-level training responses the non-scripted speech sample is most similar.

In one example, a set of speech samples from a training corpus is transcribed (e.g., by a human transcriber or automated speech recognition). Each of the speech samples is assigned a score. The set of transcribed speech samples of the training corpus is partitioned into sub-sets, where each of the sub-sets contains speech samples having identical scores. Score-level training vectors are built for each sub-set of responses as part of the score level sub-models. A score-level training vector may take a variety of forms. For example, the elements of a score-level training vector may be a sub-set of words occurring in a plurality of the responses of the training corpus having a same score. Each of those words in the sub-set is associated with a numerical weight that reflects an importance (e.g., a frequency of appearance) of that word in the training corpus responses at that score point.

The scoring features 110 may also be structured in a variety of ways. In one example, the scoring feature is a content feature in the form of an evaluation vector. That evaluation vector comprises a sub-set of the words recognized by the automatic speech recognition. Each of the words in the evaluation vector is associated with a numerical weight that reflects a relative importance of that word in the non-scripted speech sample from which the scoring features 110 are extracted. Such a value could be obtained in a variety of ways, such as based on the number of recognized appearances of the associated word in the non-scripted speech sample audio 102.

Having a score-level training vector for a scoring model 112 or sub-model, and an evaluation vector that has been extracted as a scoring feature 110 from the recognized speech 106, a speaking score 114 can be generated in whole or in part based on a similarity metric that is based on a comparison of those two vectors. In one example, the similarity metric is an average of a sum of inner products between the evaluation vector and a plurality of score-level training vectors associated with a particular score point, such as a cosine similarity metric. The scoring model 112 determines similarity metrics between the evaluation vector and each of the sub-model training vectors. These similarity metrics can be used to determine a speaking score 114 in a variety of ways. For example, the speaking score 114 may be assigned as the score point whose score-level training vector yields the highest cosine similarity metric value with the evaluation metric (max_cos). In another example, the speaking score 114 may be assigned based on the cosine similarity metric between the evaluation vector and the score-level training vector for a highest score point (cos 4) (e.g., the 4-point score-level training vector when the non-scripted speech response 102 is scored on a scale of 1-4). In a further example, the speaking score 114 may be assigned based on a weighted sum of the cosine similarity metrics, where each of the cosine similarity metrics is weighted according to the score point associated with that cosine similarity metric (cos_cmb). In a similar example, the weights are assigned based on a multiple regression procedure that uses held-out data comprising held out evaluation vectors and associated held out scores.

Figure 2:
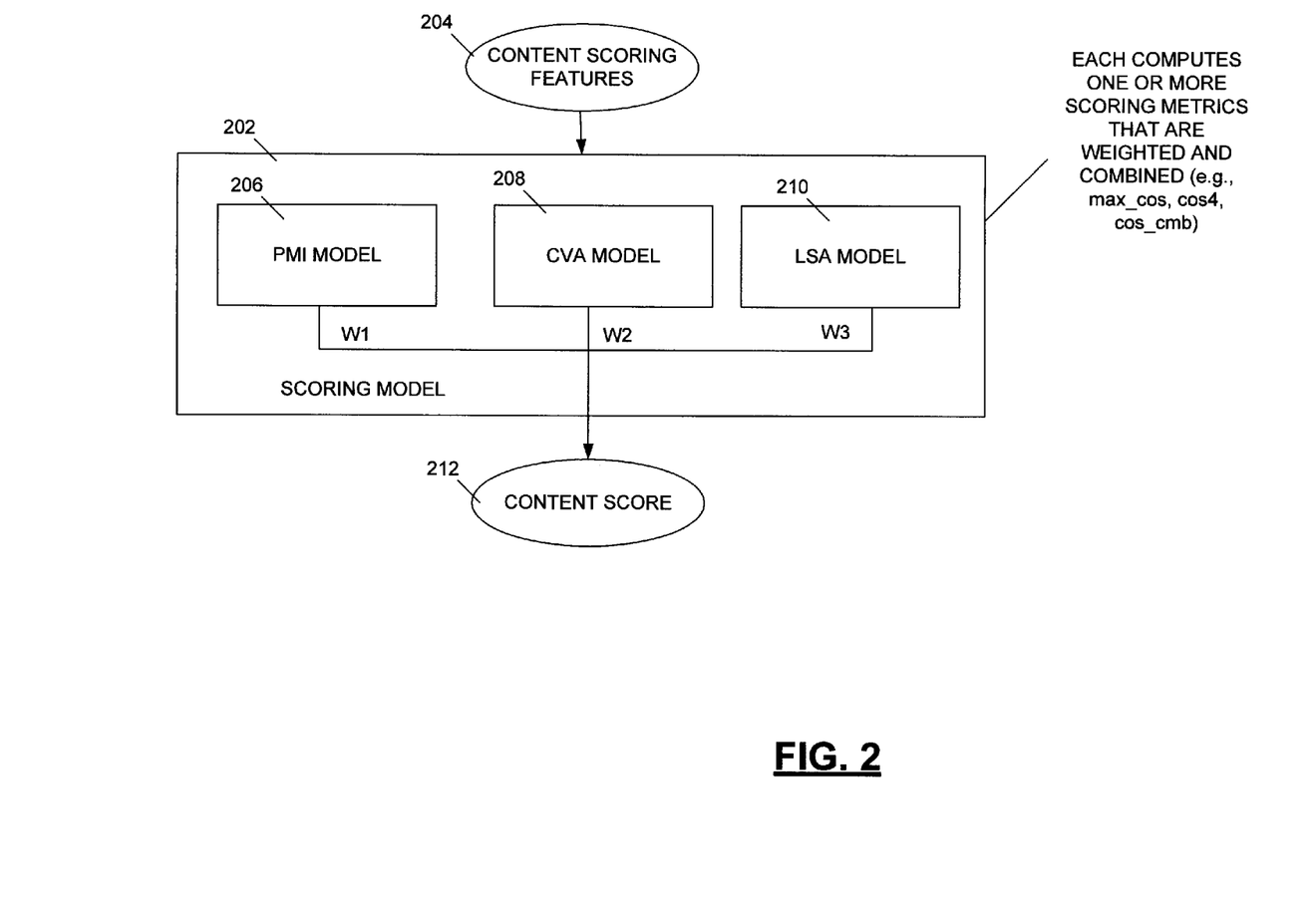
FIG. 2 is a block diagram depicting a scoring model that provides a content score based on a weighted average of outputs of different types of scoring sub-models.

The scoring model can also comprise a combination of a plurality of different types of scoring sub-models. FIG. 2 is a block diagram depicting a scoring model that provides a content score based on a weighted average of outputs of different types of scoring sub-models. The scoring model 202 receives one or more content scoring features 204. The content scoring features 204 are provided to each of a pointwise mutual information (PMI) model 206, a content vector analysis (CVA or vector space model (VSM)) model 208, and a latent semantic analysis (LSA) model 210. Each of the sub-models 206, 208, 210 outputs a sub-score that is weighted and summed to generate a content score 212 based on the content scoring features 204. For example, each of the models may calculate a max_cos, a cos 4, or a cos_cmb sub-score, which is weighted according to the weight associated with that model (W1, W2, W3, respectively), and the weighted sub-scores are summed to generate the content score 212.

The scoring sub-models may be implemented in a variety of ways. For example, the PMI model 206 may be based on word co-occurrence in a large corpus. Given two words, their PMI is computed using:

$$PMI(w_1, w_2) = \log_2 \frac{p(w_1 \& w_2)}{p(w_1) * p(w_2)}, \quad \text{(eq. 1)}$$

where $p(w_1 \& w_2)$ is the probability that $w_1$ and $w_2$ appear together, where equation 1 indicates the statistical dependency between $w_1$ and $w_2$, and can be used as a measure of the semantic similarity of two words. Given the word-to-word similarity, the similarity between two documents can be calculated according to:

$$sim(D_1, D_2) = 0.5 \left( \frac{\sum_{w \in \{D_1\}} (\max Sim(w, D_2) * idf(w))}{\sum_{w \in \{D_1\}} idf(w))} + \frac{\sum_{w \in \{D_2\}} (\max Sim(w, D_1) * idf(w))}{\sum_{w \in \{D_2\}} idf(w))} \right) \quad \text{(eq. 2)}$$

$$\max Sim(w, D_i) = \max_{w_i \in \{D_i\}} sim(w, w_i) \quad \text{(eq. 3)}$$

For each word w in document $D_1$, a word in document $D_2$ is identified that has the highest similarity to w. Similarly, for each word in $D_2$, the most similar words in $D_1$ are identified. The similarity score between the two documents is then calculated by combining the similarity of the words that they contain, weighted by their word specificity in the form of an inverse document frequency (IDF) metric.

The CVA sub-model 208 output can be determined by utilizing the content scoring features 204 in the form of an evaluation vector. The elements of the evaluation vector are weighted according to term frequency, inverse document frequency (TD*IDF). The cosine similarity score between the evaluation vector and score-level training vectors are determined to generate a sub-score for the CVA sub-model 208.

The LSA model 210 may utilize a singular value decomposition to analyze a statistical relationship between a set of documents and the words that they contain. An m-by-n word-document matrix X is built, where each element $X_{i,j}$ represents a term frequency of word i in document j. The matrix is decomposed into a product of three matrices as follows:

$$X = U\Sigma V^T \quad \text{(eq. 4)}$$

where U is an m-by-m matrix of left-singular vectors, $\Sigma$ is an n-by-n diagonal matrix of singular values, and V is an n-by-n matrix of right-singular vectors. The top ranked k singular values in $\Sigma$ are retained, and $\Sigma$ is reformulated as $\Sigma_k$. The matrix of equation 4 is recalculated accordingly:

$$X_k = U\Sigma_k V^T \quad \text{(eq. 4)}$$

Matrix $X_k$ is a smoothed or compressed version of the original matrix. The LSA model measures the similarity of two documents by the cosine between the corresponding compressed column vectors.

Evaluation vectors and score-level training vectors can be generated in a variety of ways. In one example, the vectors are generated based solely on the underlying text with which they are associated. For example, a score-level training vector for training corpus speech samples having a score of 3 could be generated using only the set of words automatically recognized in the training speech samples. Similarly, an evaluation vector could be generated using only the words recognized in a non-scripted speech sample to be scored. Measuring the relatedness of vectors generated in this fashion could be indicative of similar speech quality. However, valuable content similarity information could be lost when different, but related words, were used in the speech sample to be scored and the training corpus speech sample, such as when the speech sample to be scored uses a synonym of a word in the training corpus speech sample. Using the words of the samples alone could miss this content match between the samples.

Figure 3:
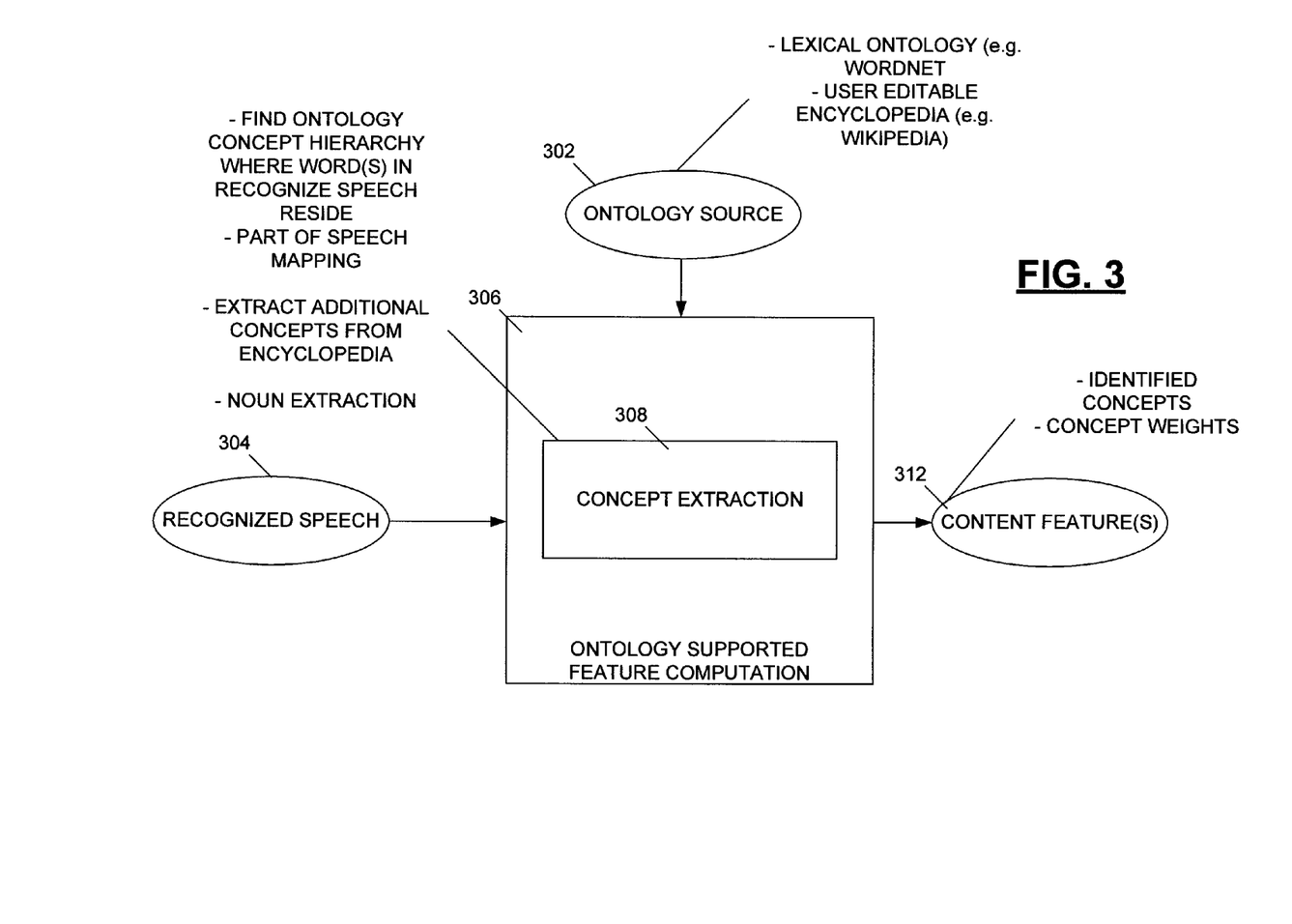
FIG. 3 is a block diagram depicting a use of an ontology source to adjust a content vector.

FIG. 3 is a block diagram depicting a use of an ontology source to adjust a content vector. An ontology source 302 is a data source that identifies relatedness among words. An ontology source 302 can be utilized to expand or condense a content vector that is representative of a training speech sample or a non-scripted speech sample to be scored. Condensing a vector can be useful in consolidating similar words (e.g., synonyms) into a single base concept to better ensure detection of overlap between training speech samples and speech samples to be scored. For example, synonyms such as "chance" and "opportunity" in a vector may be consolidated into a single "opportunity" concept entry in a vector, resulting in a tabulation of the number of overlaps of the use of the "opportunity" concept between a speech sample to be scored and training speech samples. Such a consolidation would detect an overlap where the training speech sample used the word "chance" while the speech sample to be scored used the word "opportunity."

An ontology can also be used to expand a content vector. When a content vector for a speech sample to be scored includes the word "opportunity," a query to the ontology source 302 can identify "chance" as a related word with similarity. The content vector can be expanded to include the word "chance" as well as the already present word "opportunity." Using such an expansion method, a concept overlap between a training speech sample and a speech sample to be scored can be identified where the speech sample to be scored used the word "opportunity" while the training speech sample used the word "chance."

FIG. 3 depicts the modification of an evaluation vector, initially generated based upon automatically recognized speech 304, based on an ontology source 302. While the example of FIG. 3 is directed to an evaluation vector, similar procedures can be performed on a training speech sample vector, such as a score-level training vector. The recognized speech 304 from a non-scripted speech sample to be scored is received for ontology supported feature computation 306. The ontology supported feature computation 306 is performed to extract 308 a content scoring feature in the form of an evaluation vector 310 that has been adjusted according to an ontology source 302.

An ontology source 302 may take a variety of forms. For example, an ontology source 302 may comprise a plurality of content hierarchies, where a content hierarchy includes a hierarchical arrangement of words underneath a root concept. An example of such an ontology source 302 is the WordNet lexical database, which groups words into sets of synonyms called synsets.

A hierarchical ontology source 302 can be used to consolidate a word vector, such as an evaluation vector. For example, a word in an initial vector, such as a vector of words 304 generated based on the automatically recognized speech 304, is searched for in the hierarchical ontology source 302. When the initial vector word is identified in a hierarchy, the hierarchy is traced to its root to identify the related concept. Part of speech matching may be used to clarify any ambiguities as to the correct hierarchy with which to associated the initial vector word (e.g., train can be a noun or verb, and the context of the use of the word can be used to map the word train to the correct part of speech and subsequently to the correct ontology source hierarchy). The initial vector word can then be replaced by the root concept word for the hierarchy in which the initial vector word is located in the output evaluation vector content scoring feature 310. If the root concept word is already present in the evaluation content vector, then a count of the appearances of that concept in the non-scripted speech sample can be incremented in the evaluation vector.

A hierarchical ontology source 302 can also be used to expand an evaluation vector. For example, a word in the automatically recognized vector of words 304 can be searched for in the hierarchical ontology source 302. Additional words present in the hierarchy in which the evaluation vector word is located can be incorporated into the evaluation vector to broaden the set of words associated with the non-scripted speech sample by incorporating words that the hierarchical ontology source 302 notes as being related to the initial vector 304.

The ontology source 302 may take other forms as well, such as a corpus of documents, such as might be present in a user-editable encyclopedia. A user-editable encyclopedia, such as Wikipedia, provides an ontology source that can be used to identify words that are related to words present in a vector. For example, a vector can be expanded by performing a search for a word present in an initial vector and expanding the initial vector by incorporating words present in the article located by the search (e.g., in the body of a located article, in a "see also" section of a located article). For example, an encyclopedia article for the word "lawyer" may utilize related words "attorney" and "counsel" in the body of the article that can be included in the expanded vector. Similarly, when a word in the initial vector is located in the body an article, that word in the initial vector can be consolidated to a concept based on the title of the article in which the word was located. While often less structured than a hierarchical ontology source such as WordNet, the corpus of indexed documents provides an alternative ontology source that can provide quality evaluation and training speech sample vector alterations.

Figure 4:
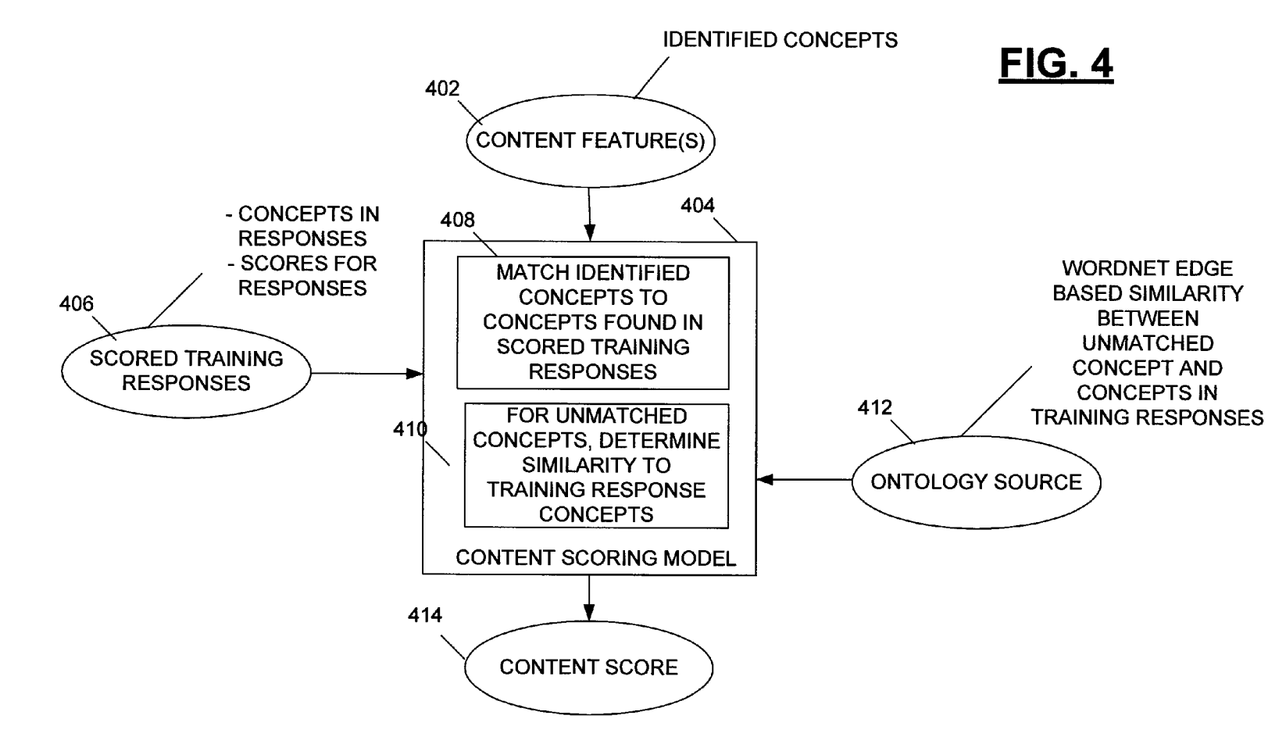
FIG. 4 is a block diagram depicting supplemental matching between vectors utilizing an ontology source.

As noted above, a content score can be generated by comparing two vectors of words, such as an evaluation vector associated with a non-scripted speech sample to be scored and a score-level training vector that is generated based on a number of training speech samples that have been previously scored at a particular score level. Such a comparison can be further advanced through use of an ontology source. FIG. 4 is a block diagram depicting supplemental matching between vectors utilizing an ontology source. A content scoring feature 402, such as concept identifiers in an evaluation vector are received by a content scoring model 404 along with scored training responses 406, such as in the form of a score-level training vector that includes concept identifiers. At 408, matches are identified between identified concepts in the evaluation vector 402 and concepts identified in the score-level training vector 406.

Certain concepts in either of the evaluation or the score-level training vector may remain unmatched after the matching procedure at 408. A second attempt to match those concepts is made at 410 utilizing an ontology source 412 as an aid. In one example, when a concept identifier in the evaluation vector is not matched at 408, a similarity score is determined for the concept identifier based on a recognized word from the speech sample in the evaluation vector and each of the concept identifiers in the score-level training vector (e.g., via an edge based similarity calculation, via a query of a lexical database containing word co-occurrence statistics). The average of weights associated with the concept identifiers that have a highest n similarity scores is assigned as a weight for the concept identifier not found in the score-level training vector.

Figure 5:
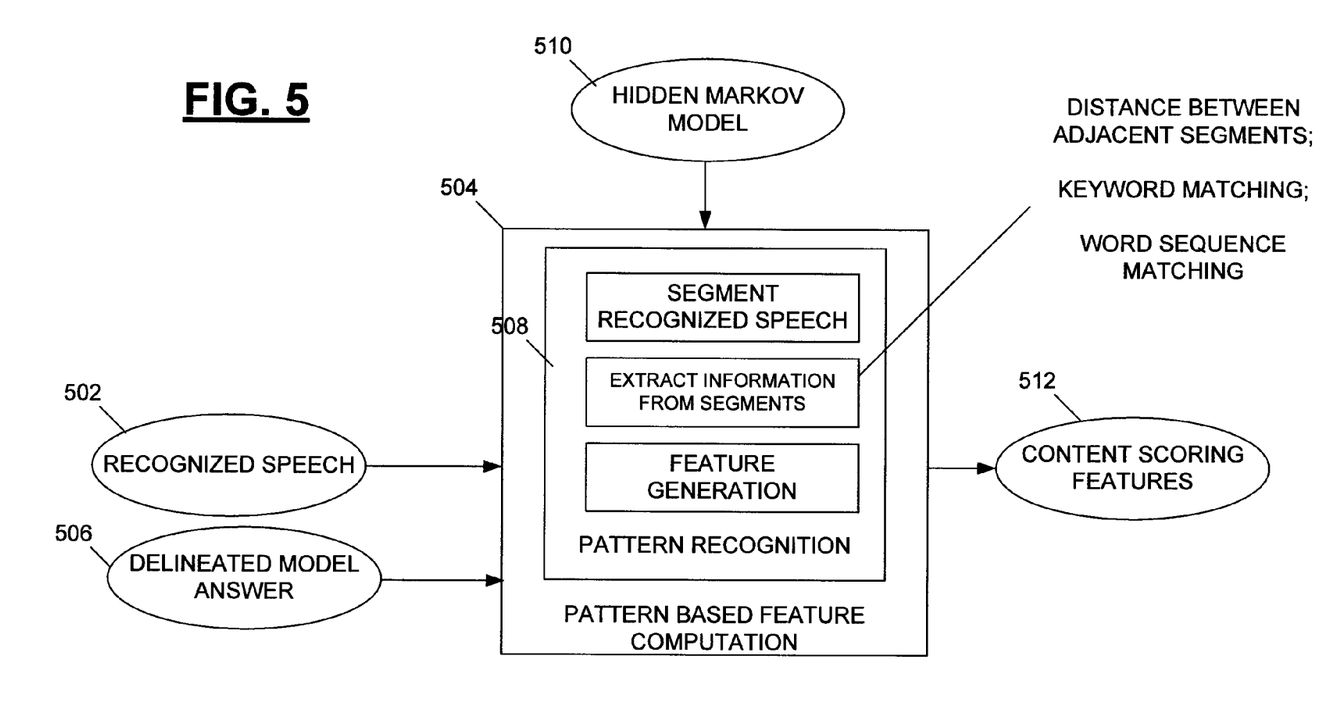
FIG. 5 is a block diagram depicting the generation of content scoring features using pattern recognition.

The preceding disclosure describes example systems and methods for comparing concepts located in a non-scripted speech sample to concepts found in training speech samples to determine a score for the non-scripted speech sample to be scored. In some implementations, performance of such scoring can be improved by comparing certain segments of the non-scripted speech sample to particular portions of a standard to which the non-scripted speech sample is being compared. FIG. 5 is a block diagram depicting the generation of content scoring features using pattern recognition. Recognized speech 502 from a non-scripted speech sample to be scored is received for pattern based feature computation 504 along with a delineated model answer 506 that identifies an overarching topic for the model answer as well as a plurality of concepts associated with the topic that are addressed by the model answer. Each of the words of the model answer is associated with one or more of the overarching topic and the plurality of concepts. Pattern recognition is performed at 508, such as through aid of a Hidden Markov Model 510, to determine which words of the recognized speech 502 should be associated with each topic or concept in the delineated model answer 506. The segmented recognized speech is outputted as the content scoring features 512. The words of the segmented speech 512 may then be compared to the associated portions of the delineated model answer 506 to determine a similarity between the recognized speech 502 and the delineated model answer 506.

In one example, the content feature is generated by segmenting the speech sample 502 into multiple parts, extracting information from each part, based on the words recognized, combining the information extracted on each segment into a sub-feature, and combining all sub-features to generate the content feature 512 for the speech sample. The information extracted for each part may be based on a variety of measurements, such as measurements of distance to adjacent segments, keyword matching and a training vector of keywords, or sequences of words matching sequences from a training corpus.

In one example, to measure content development, a table of item content is constructed by analyzing a speaking stimulus and reference points created by item developers. For each item, a list of concrete concepts is extracted plus general information which test takers should cover in their responses. While concepts may be explicitly listed by keywords at the end of the prompt to help test takers organize their response, the general information is necessary for make connections between content concepts. For each concept (considering general information as one concept), the content information is extracted from four aspects:

1. Name—the keyword listed in the prompt
2. Facts—words or phrases describing the concept properties
3. Key Points—sentences addressing the concept in the model response provided by test developers
4. Context—transcription of part of the stimulus that talks about the concept Take the item the Frog for instance: the stimulus is part of a lecture in which a teacher is talking about the life cycle of frogs. The corresponding item content table is:

TABLE 1 item content table of the Frog

| Concept _index | Name | Facts | Key Points |
|---|---|---|---|
| 0 | | frog, physical changes, life, water, land, born, grows, moves | A frog goes through several physical changes from the time it is born in water until it grows and moves to land. |
| 1 | tadpole | first stage, water, little fish, tail, swim, gills, breath | In the first stage, a frog is called a tadpole. A tadpole lives in water; it has a tail and breathes with gills. |
| 2 | tadpole with legs | second stage, little legs, like a frog, back, front | Next, in the second stage, the tadpole grows back legs, and soon it grows front legs, too. The tadpole with legs still has a tail, and it lives in water. |
| 3 | froglet | third stage, small frog, fully developed, tail, shorter, lungs, out of water, land | In the third stage, the tadpole grows into a froglet. A froglet has fully developed legs and a shorter tail than a tadpole. It also starts to grow lungs. |
| 4 | adult frog | last, fourth stage, adult, no tails, become, live on land, breathe air through lungs | In the last stage, the froglet becomes an adult frog. An adult frog has no tail, and it lives on land and breathes air. |

Given a list of concepts, the related responses can be split into segments, each of which is self-contained addressing a single concept. The points in the table above can be treated as the segments split from the whole model response based on the list of concepts. To automatically segment student response by concepts, a sequential classifier, such as a Hidden Markov Model, is trained to label each token of a response with tags corresponding to each of the concept segments and to split the response by the tag sequence.

Example features that can be used by the sequential classifier to segment the response include:

Response word index

Indicators of the presence of concept names

Indicators of the presence of facts corresponding to each concept

Signed distance to the closest occurrence of each concept name

Signed distance to the closest occurrence of any fact of each concept

POS tags

The content features for each segment are created regarding every aspect of each concept. These features of all segment of a response are then aggregated and weighted based on the segment concept labels. For example:

1. Segment Feature Extraction

Segment concept features are computed as the following:

Regardless of the concept label, we measure the content development in a given segment for each related concept (k in [0, 3]), from four aspects separately:

cname_k: # of occurrence of the concept name in the segment;

factFreq_k: segment score return by F(s) against the concept facts, and normalize it by the score computed from the concept point;

F(s)=sum of (word) length of each fact if present, plus the frequency of the fact unigrams normalized by the fact (word) length;

Sim2ctx_k: similarity between the segment and the concept context using WordNet;

Sim2point_k: similarity between the segment and the concept point using WordNet1

2. Aggregation

The content features of each segment are aggregated to the concept level: for response of each concept, a corresponding concept-feature score is computed which takes the maximum value computed from segments labeled as that concept (e.g., cell in matrix X). Second, aggregate up to the response level: sum up the feature value across 4 concept levels (e.g., $C_i$ (Resp)). Then, for each aspect (cname, factFreq, sim2ctx, sim2point), the mean, maximum, minimum, and standard deviation of the related features are computed (e.g., {cname_K}, k=0, 1, 2, 3). While the mean captures the overall content coverage in a response, the maximum corresponds to the concept elaborated most and the min corresponds to the concept of most limited development.

In addition to the simple statistics, a special weighting algorithm may also be utilized that takes into account which segment contributes to the feature score most and whether the segment belongs to the related concept. To illustrate how the algorithm works, the concept-level content features for a given aspect are formatted as matrix X. x<i,j> that indicates how much information about concept j is carried in response segments that are supposed to address concept i. Ideally, the feature value should be 0 where i !=j. Considering errors introduced by segmentation, segments labeled as X might also contribute to the content development of Y, especially where X follows or precedes Y by concept index. However, if the segmentation result is so wrong that the feature score of segments of some other concept is greater than that of itself, then the score should be penalized correspondingly.

|  | C1 | C2 | C3 | C4 |
|---|---|---|---|---|
| Resp_c1 | <1, 1> | <1, 2> |  |  |
| Resp_c2 | <2, 1> |  |  |  |
| Resp_c3 |  |  |  |  |
| Resp_c4 |  |  |  |  |
| sum | $C_1$(Resp) | $C_2$(Resp) | $C_3$(Resp) | $C_4$(Resp) |

$$\text{Scoring matrix } A = \begin{vmatrix} 1 & 1 & 0 & 0 \\ 1 & 1 & 1 & 0 \\ 0 & 1 & 1 & 1 \\ 0 & 0 & 1 & 1 \end{vmatrix}$$

Matrix B is 4 by 4, in which only cells that have the maximum value of each row in X is 1 and all the rest are equal to zero. Matrix B indicates which concept is developed most in segments of each category. I is 4 by 4 identity matrix. In the ideal case, B=I. For scoring, (B−I) is used as the penalty matrix. Thus the matrix scoring based on content features at the level of concept category is:

$$f_{matrix}(X) = X \cdot A - 0.5 X \cdot (B-I)$$

Figure 6A:
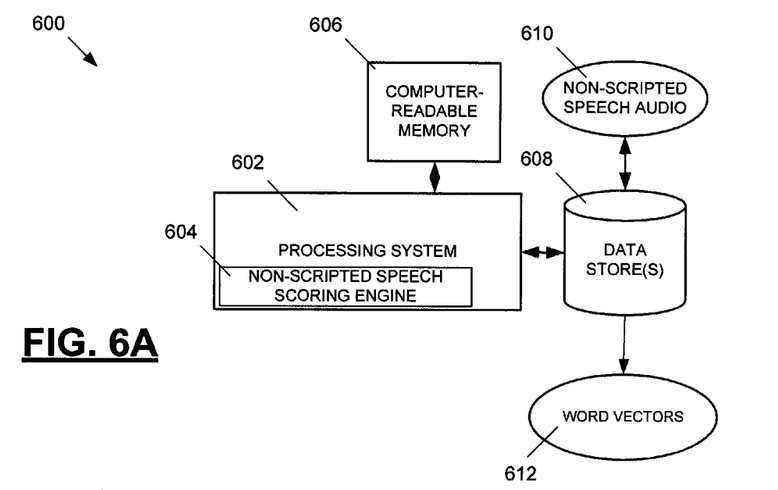
FIGS. 6A, 6B, and 6C depict example systems for use in implementing a non-scripted speech scoring engine.
Figure 6B:
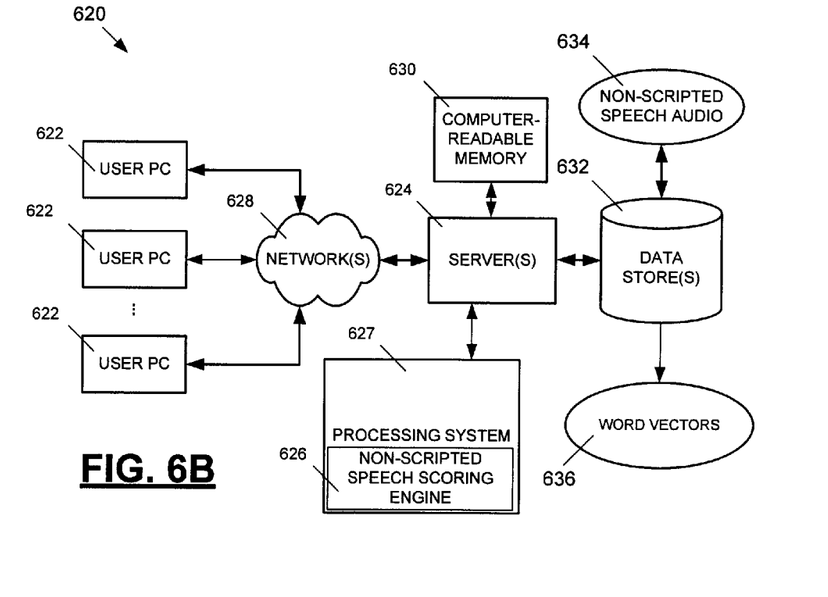
Figure 6C:
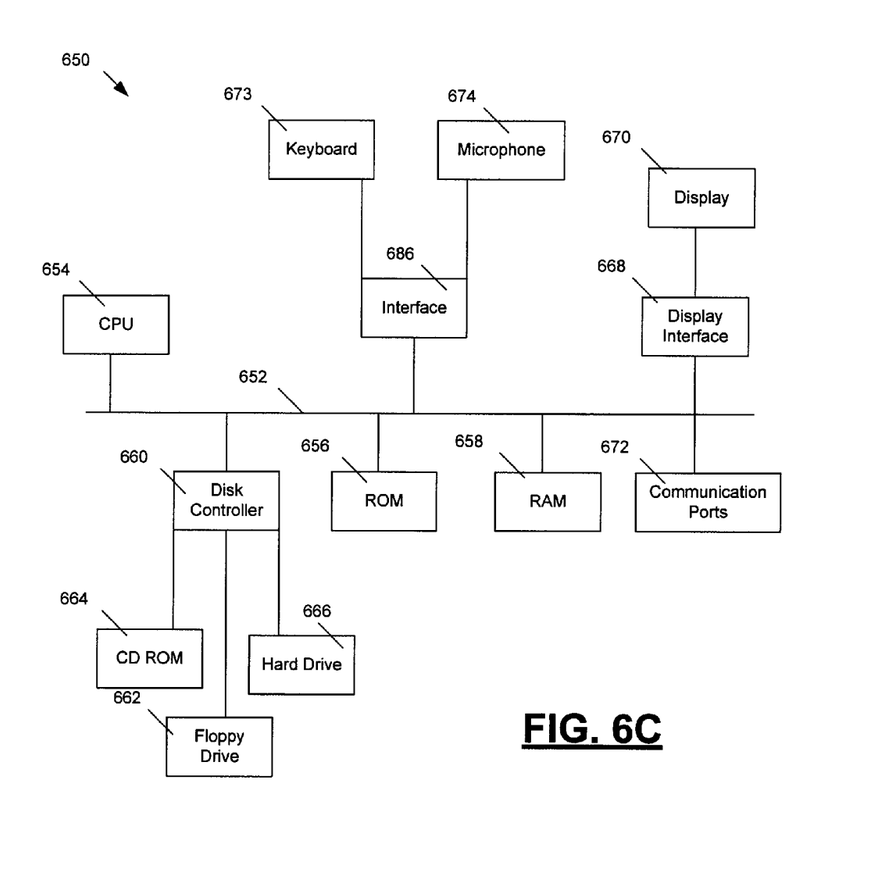

Examples have been used to describe the invention herein, and the scope of the invention may include other examples. FIGS. 6A, 6B, and 6C depict example systems for use in implementing a non-scripted speech scoring engine. For example, FIG. 6A depicts an exemplary system 600 that includes a standalone computer architecture where a processing system 602 (e.g., one or more computer processors located in a given computer or in multiple computers that may be separate and distinct from one another) includes a non-scripted speech scoring engine 604 being executed on it. The processing system 602 has access to a computer-readable memory 606 in addition to one or more data stores 608. The one or more data stores 608 may include non-scripted speech audio 610 as well as word vectors 612.

FIG. 6B depicts a system 620 that includes a client server architecture. One or more user PCs 622 access one or more servers 624 running a non-scripted speech scoring engine 626 on a processing system 627 via one or more networks 628. The one or more servers 624 may access a computer readable memory 630 as well as one or more data stores 632. The one or more data stores 632 may contain non-scripted speech audio 634 as well as word vectors 636.

FIG. 6C shows a block diagram of exemplary hardware for a standalone computer architecture 650, such as the architecture depicted in FIG. 6A that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 656 and random access memory (RAM) 658, may be in communication with the processing system 654 and may contain one or more programming instructions for performing the method of implementing a non-scripted speech scoring engine. Optionally, program instructions may be stored on a non-transitory computer readable storage medium such as a magnetic disk, optical disk, recordable memory device, flash memory, or other physical storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 672.

In addition to the standard computer-type components, the hardware may also include data input devices, such as a keyboard 673, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 7:
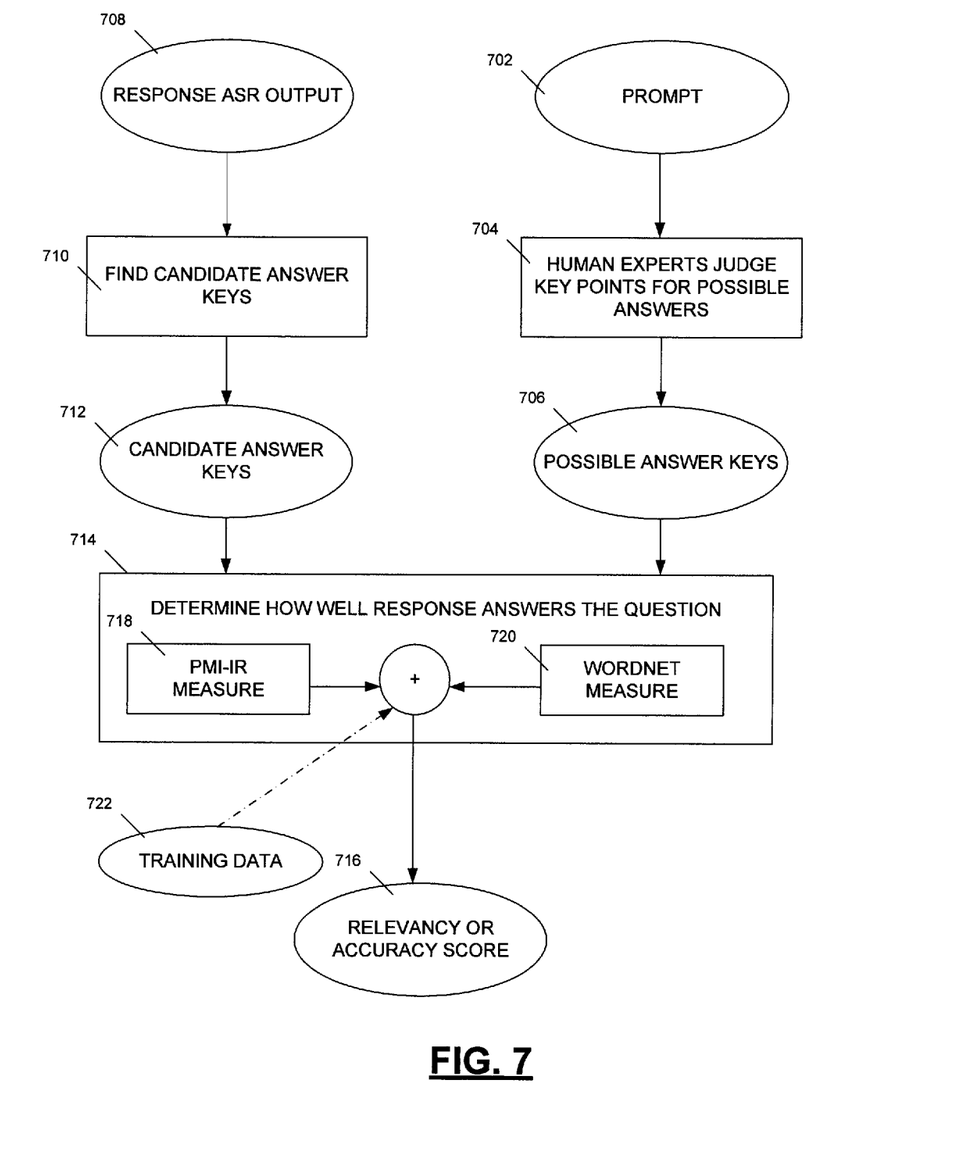
FIG. 7 is a flow diagram depicting another example process for determining a relevancy or accuracy score.

As another example, FIG. 7 is a flow diagram depicting another example process for generating a relevancy or accuracy score. A prompt 702 is provided to human experts at 704 to identify possible quality answers 706 to the prompt. A response to be scored is received as a vector of words 708 from an automatic speech recognizer. Candidate words in the vector 708 which are likely to be content words associated with the prompt are identified at 710 as candidate answer keys 712 (e.g., using a noun phrase chunker or a name entity recognizer). The vector of candidate answer keys 712 is compared to the possible answer keys vector 706 at 714 to determine a relevancy and accuracy score 716. In one example, the score 716 is generated based on a plurality of sub-evaluations of the candidate answer keys 712. For example, a point mutual information by information retriever model (PMI-IR) 718 may compute semantic similarities between the candidate answer keys 712 and the possible answer keys 706, such as by checking the co-occurrence of terms in the vectors 712, 706 in a corpus of documents (e.g., a collection of documents from the internet). A WordNet model 720 may also be used to compute semantic similarities between the vectors 712, 716. The outputs of the models 718, 720 are combined to generate the relevancy or accuracy score 716. For example, the outputs of the models 718, 720 may be combined as a weighted sum, where the weights are determined based on a regression analysis that utilizes training data 722 containing pre-scored responses to the prompt 702.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of scoring a non-scripted speech sample, comprising:
    extracting, using a processing system, a content feature from a set of words automatically recognized in the non-scripted speech sample; and
    scoring, using the processing system, the non-scripted speech sample by providing the extracted content feature to a content scoring model to generate a content-based speech score, the content scoring model comparing the extracted content feature to one or more score-level training vectors of a training corpus to generate the content-based speech score, the score-level training vectors having been determined from partitioning a set of scored, transcribed speech samples of the training corpus into sub-sets, with each of the sub-sets containing speech samples with identical scores.

2. The method of claim 1, wherein the speech samples of the training corpus are transcribed by human transcribers.

3. The method of claim 1, wherein the speech samples of the training corpus are transcribed by an automated speech recognizer.

4. The method of claim 1, wherein the score for each speech sample is assigned by a human rater.

5. The method of claim 1, wherein the score for each speech sample is assigned by an automatic process.

6. The method of claim 1, wherein the elements of a score-level training vector are a sub-set of words occurring in a plurality of responses of the training corpus with a same score, and where each word is associated with a numerical weight, reflecting a relative importance of that word in the sub-set of responses at the score point associated with the score-level training vector.

7. The method of claim 1, wherein the content scoring model includes a content vector analysis model, a latent semantic analysis model, or a pointwise mutual information model.

8. The method of claim 7, wherein the content vector model comprises vectors of words and associated numerical weights, indicating relative importance of words of the vectors.

9. The method of claim 7, wherein the latent semantic analysis model comprises singular-value decomposed vectors of words and associated numerical weights, indicating relative importance of words of the vectors.

10. The method of claim 7, wherein the pointwise mutual information model comprises vectors of words and associated numerical weights, indicating the relative importance of words of the vectors based on a training corpus.

11. The method of claim 1, wherein building the score-level training vectors further comprises:
   comparing a particular word from the set of transcribed words to an ontology data store, wherein the ontology data store comprises a plurality of content hierarchies, wherein a particular content hierarchy includes a particular concept identifier, and wherein the particular content hierarchy further includes a plurality of words associated with the particular concept identifier; and
   using the particular concept identifier as the element in the score-level training vector when the particular transcribed word matches one of the plurality of words associated with the particular concept identifier.

12. The method of claim 1 further comprising:
   receiving the non-scripted speech sample; and
   recognizing the set of words using automatic speech recognition, wherein a confidence metric is associated with each recognized word, and wherein the scoring of the non-scripted speech sample is based on the confidence metric.

13. A computer-implemented method of scoring a non-scripted speech sample, comprising:
   extracting, using a processing system, a content feature from a set of words automatically recognized in the non-scripted speech sample; and
   scoring, using the processing system, the non-scripted speech sample by providing the extracted content feature to a content scoring model to generate a content-based speech score,
   wherein the content feature of a speech sample is an evaluation vector comprising a sub-set of the words recognized by the automated speech recognition and an associated numerical weight for each word that reflects a relative importance of the word,
   wherein a similarity metric is used to compare the evaluation vector of a received speech sample with each score-level training vector of a plurality of score-level training vectors of the content scoring model to obtain the content score of the speech sample, and
   wherein the similarity metric is an average of a sum of inner products between the evaluation vector and the plurality of score-level training vectors of a score point.

14. The method of claim 13, wherein a score corresponding to the score point of score-level training vectors with the highest similarity to the evaluation vector is assigned as the score for the speech sample.

15. The method of claim 13, wherein the similarity between the evaluation vector and the score-level training vectors with the highest score is assigned as the score for the speech sample.

16. The method of claim 13, wherein the content score of a speech sample is based on a multiple regression model for similarities with each plurality of score-level vectors, and wherein weights of the multiple regression model are trained based on held-out data.

17. The method of claim 13, wherein building the evaluation vector further comprises:
   comparing a particular word from the set of recognized words to an ontology data store, wherein the ontology data store comprises a plurality of content hierarchies, wherein a particular content hierarchy includes a particular concept identifier, and wherein the particular content hierarchy further includes a plurality of words associated with the particular concept identifier; and
   using the particular concept identifier as the element in the evaluation vector when the particular recognized word matches one of the plurality of words associated with the particular concept identifier.

18. The method of claim 13, wherein extracting the content feature further comprises:
   generating a set of expected answers that are relevant to a prompt to which the non-scripted speech sample responds;
   automatically extracting possible candidate answer phrases from the recognized word sequence; and
   comparing a particular recognized phrase to the set of expected answers.

19. The method of claim 18 wherein a phrase chunker or a named entity recognizer is used to extract possible candidate answer phrases.

20. The method of claim 18, wherein comparing a particular recognized phrase to the set of expected answers further comprises:
   querying a lexical database with word co-occurrence statistics;
   computing a similarity metric between a particular recognized phrase and each of the expected answers using the co-occurrence statistics;
   computing a content feature using a weighted sum of the similarity metrics.

21. The method of claim 13, wherein extracting the content feature further comprises:
   using a dimensionality reduction method to process the automatically recognized words.

22. The method of claim 21 wherein Latent Semantic Analysis or a Hidden Markov Model are used as the dimensionality reduction method.

23. The method of claim 13, wherein the content feature is generated by a process comprising:
   segmenting the speech sample into multiple parts;
   extracting information from each part, based on the words recognized;
   combining the information extracted on each segment to a sub-feature; and
   combining all sub-features to generate the content feature for the speech sample.

24. The method of claim 23, wherein the segmentation is performed using a Hidden Markov Model trained on annotated data.

25. The method of claim 23, wherein the information extracted for each part includes measures of distance to adjacent segments, keywords matching a training vector of keywords, or sequences of words matching sequences from a training corpus.

26. A computer-implemented method of scoring a non-scripted speech sample, comprising:
   extracting, using a processing system, a content feature from a set of words automatically recognized in the non-scripted speech sample; and
   scoring, using the processing system, the non-scripted speech sample by providing the extracted content feature to a content scoring model to generate a content-based speech score,
   wherein the content feature of a speech sample is an evaluation vector comprising a sub-set of the words recognized by the automated speech recognition and an associated numerical weight for each word that reflects a relative importance of the word,
   wherein scoring the non-scripted speech sample includes identifying whether the concept identifier of a word in the recognized speech sample is present in the score-level training vector associated with a particular score point, wherein when the concept identifier is not present:
determining a similarity score for the concept identifier based on a recognized word in the speech sample and each of the concept identifiers in a score-level training vector associated with the particular score point, and
assigning the average of the weights associated with the concept identifiers that have a highest n similarity scores as a weight for the concept identifier not found in the score-level training vector.

27. The method of claim 26, wherein the similarity score is based on an edge-based similarity measurement for the concept identifier based on a recognized word of the speech sample and the concept identifiers of the score-level training vector associated with the particular score point.

28. A computer-implemented system for scoring a non-scripted speech sample, comprising:
one or more data processors;
one or more computer-readable mediums encoded with:
a non-scripted speech sample data structure, wherein the non-scripted speech sample data structure includes:
a speech sample identifier that identifies a non-scripted speech sample;
a content feature extracted from the non-scripted speech sample; and
a content-based speech score for the non-scripted speech sample;
instructions for commanding the one or more data processors to extract the content feature from a set of words automatically recognized in the non-scripted speech sample and to score the non-scripted speech sample by providing the extracted content feature to a scoring model to generate the content-based speech score, the scoring model comparing the extracted content feature to one or more score-level training vectors of a training corpus to generate the content-based speech score, the score-level training vectors having been determined from partitioning a set of scored, transcribed speech samples of the training corpus into sub-sets, with each of the sub-sets containing speech samples with identical scores.

29. The system of claim 28, wherein the data structure is a data base.

30. The system of claim 28, wherein the speech samples of the training corpus are transcribed by human transcribers.

31. The system of claim 28, wherein the speech samples of the training corpus are transcribed by an automated speech recognizer.

32. The system of claim 28, wherein the score for each speech sample is assigned by a human rater.

33. The system of claim 28, wherein the score for each speech sample is assigned by an automatic process.

34. The system of claim 1, wherein the elements of a score-level training vector are a sub-set of words occurring in a plurality of responses of the training corpus with a same score, and where each word is associated with a numerical weight, reflecting a relative importance of that word in the sub-set of responses at the score point associated with the score-level training vector.

35. The system of claim 28, wherein building the score-level training vectors comprises:
comparing a particular word from the set of transcribed words to an ontology data store, wherein the ontology data store comprises a plurality of content hierarchies, wherein a particular content hierarchy includes a particular concept identifier, and wherein the particular content hierarchy further includes a plurality of words associated with the particular concept identifier; and
using the particular concept identifier as the element in the score-level training vector when the particular transcribed word matches one of the plurality of words associated with the particular concept identifier.

36. A computer-implemented system for scoring a non-scripted speech sample, comprising:
one or more data processors;
one or more computer-readable mediums encoded with:
a non-scripted speech sample data structure, wherein the non-scripted speech sample data structure includes:
a speech sample identifier that identifies a non-scripted speech sample;
a content feature extracted from the non-scripted speech sample; and
a content-based speech score for the non-scripted speech sample;
instructions for commanding the one or more data processors to extract the content feature from a set of words automatically recognized in the non-scripted speech sample and to score the non-scripted speech sample by providing the extracted content feature to a scoring model to generate the content-based speech score,
wherein the content feature of a speech sample is an evaluation vector comprising a sub-set of the words recognized by the automated speech recognition and an associated numerical weight for each word that reflects a relative importance of the word,
wherein a similarity metric is used to compare the evaluation vector of a received speech sample with each score-level training vector of a plurality of score-level training vectors of the scoring model to obtain the content score of the speech sample, and
wherein the similarity metric is an average of a sum of inner products between the evaluation vector and the plurality of score-level training vectors of a score point.

37. The system of claim 36, wherein a score corresponding to the score point of score-level training vectors with the highest similarity to the evaluation vector is assigned as the score for the speech sample.

38. The system of claim 36, wherein the similarity between the evaluation vector and the score-level training vectors with the highest score is assigned as the score for the speech sample.

39. The system of claim 36, wherein the content score of a speech sample is based on a multiple regression model for similarities with each plurality of score-level vectors, and wherein weights of the multiple regression model are trained based on held-out data.

40. A computer-implemented system for scoring a non-scripted speech sample, comprising:
one or more data processors;
one or more computer-readable mediums encoded with:
a non-scripted speech sample data structure, wherein the non-scripted speech sample data structure includes:
a speech sample identifier that identifies a non-scripted speech sample;
a content feature extracted from the non-scripted speech sample; and
a content-based speech score for the non-scripted speech sample;
instructions for commanding the one or more data processors to extract the content feature from a set of words automatically recognized in the non-scripted speech sample and to score the non-scripted speech sample by providing the extracted content feature to a scoring model to generate the content-based speech score, wherein the content feature of a speech sample is an evaluation vector comprising a sub-set of the words recognized by the automated speech recognition and an associated numerical weight for each word that reflects a relative importance of the word, wherein scoring the non-scripted speech sample includes identifying whether the concept identifier of a word in the recognized speech sample is present in the score-level training vector associated with a particular score point, wherein when the concept identifier is not present:
determining a similarity score for the concept identifier based on a recognized word in the speech sample and each of the concept identifiers in a score-level training vector associated with the particular score point, and assigning the average of the weights associated with the concept identifiers that have a highest n similarity scores as a weight for the concept identifier not found in the score-level training vector.

41. The system of claim 40, wherein the similarity score is based on an edge-based similarity measurement for the concept identifier based on a recognized word of the speech sample and the concept identifiers of the score-level training vector associated with the particular score point.

* * * * *